(12) United States Patent
Gill (10) Patent No.: US 8,430,080 B2
(45) Date of Patent: Apr. 30, 2013

(54) OTTO-CYCLE INTERNAL COMBUSTION ENGINE

(76) Inventor: Michael John Gill, Hampshire (GB)

( * ) Notice: Subject to any disclaimer, the term of this patent is extended or adjusted under 35 U.S.C. 154(b) by 828 days.

(21) Appl. No.: 12/449,436

(22) PCT Filed: Jan. 30, 2008

(86) PCT No.: PCT/GB2008/000297
§ 371 (c)(1),
(2), (4) Date: Nov. 23, 2009

(87) PCT Pub. No.: WO2008/096104
PCT Pub. Date: Aug. 14, 2008

(65) Prior Publication Data
US 2010/0059004 A1 Mar. 11, 2010

(30) Foreign Application Priority Data
Feb. 9, 2007 (GB) .................................. 0702570.3

(51) Int. Cl.
*F02D 41/02* (2006.01)
*F02D 13/02* (2006.01)
*F01L 1/18* (2006.01)

(52) U.S. Cl.
USPC .................................................... 123/406.35

(58) Field of Classification Search ............. 123/406.35; 60/600, 602, 611; 701/93, 102, 101, 110
See application file for complete search history.

(56) References Cited

U.S. PATENT DOCUMENTS

| | | | |
|---|---|---|---|
| 4,254,625 A * | 3/1981 | Bergstedt et al. | 60/602 |
| 5,113,826 A | 5/1992 | Anzai | |
| 6,360,719 B1 | 3/2002 | Uitenbroek | |
| 6,443,125 B1 * | 9/2002 | Mendler | 123/316 |
| 6,449,553 B1 * | 9/2002 | Saur et al. | 701/102 |
| 2001/0013322 A1 | 8/2001 | Arai et al. | |
| 2003/0213930 A1 | 11/2003 | Kreuter | |

FOREIGN PATENT DOCUMENTS

| | | |
|---|---|---|
| DE | 19600535 A1 * | 7/1997 |
| EP | 0 194 503 A1 | 9/1986 |
| EP | 0 777 038 A2 | 6/1997 |
| GB | 2 239 901 A | 7/1991 |
| JP | 03271535 A * | 12/1991 |

* cited by examiner

*Primary Examiner* — Hieu T Vo
(74) *Attorney, Agent, or Firm* — Clark & Brody (57) ABSTRACT

An Otto cycle internal combustion engine (10) provided with a combustion chamber (14) and an inlet (18) and an outlet (20) with respective valves (24 and 26), and a suction passage (29) leading to the said at least one inlet (18) to conduct the flow of fluid material thereto. The engine (10) further comprises a control valve (28) arranged upstream of the inlet valve (24) and being operable to change between a condition in which it opens the suction passage (29) and a condition in which it closes the suction passage (29). An engine operating position sensor (90) provides signals indicative of the operating position of the engine (10). There is also an engine power control (92). A variable intermediate position control signal generator (95), generates control signals at times respectively between the beginning and the end of each of a succession of inlet valve opening periods of the engine cycle. It is connected to receive signals from the engine operating position sensor (90) and the engine power control (92) and to send the control signals to the control valve (28) in such a manner that in between an opening of the inlet valve (24) and the immediately following closure thereof there is a period in which the suction passage (29) is open and a period in which it is closed, the period for which it is open being in dependence upon the engine power control (92) output. The invention extends to a method of operating such an engine (10).

29 Claims, 13 Drawing Sheets

0 = transistor off (non-conducting)
1 = transistor on (conducting)

| A | B | C | D | Valve action |
|---|---|---|---|---|
| 0 | 0 | 0 | 0 | Inactive but free to move |
| 1 | 0 | 1 | 0 | Inactive, restrained |
| 0 | 1 | 0 | 1 | Inactive, restrained |
| 1 | 0 | 0 | 1 | Force applied |
| 0 | 1 | 1 | 0 | Force applied, opposite sense |

Fig. 3c

```
Example deactivation sequences
# = deactivated cycle
Average % of full power given
Numbering represents normal combustion sequence 3 cylinder 123123123123123123123
   #     #     #     #       80%
   #  #     #  #     #       75%
 # # # # # # # # # #         50%
 # ## # ## # ## # ##         40%
 ###   ###   ###   ###  ###  25%
```

Fig. 4a

```
4 cylinder

```
5 cylinder

Pressure vs. volume - induction stroke & first part of compression stroke

Fig. 5a

Pressure vs. volume - all four strokes

Valve positions and cylinder volume vs. crankshaft position - one complete cycle starting with induction

OTTO-CYCLE INTERNAL COMBUSTION ENGINE

The present invention relates to an Otto-cycle internal combustion engine provided with at least one combustion chamber and at least one inlet and at least one outlet with respective valves at the said at least one inlet and at the said at least one outlet respectively to enable fluid material to flow into and out of the said at least one combustion chamber in accordance with the engine cycle operation, and a suction passage leading to the said at least one inlet to conduct the flow of fluid material thereto. The fluid may be entirely gaseous, but more usually it will comprise an aerosol.

U.S. Pat. No. 2001/0013322 A1 and EP 0777038 A3 disclose internal combustion engines in which the inlet and outlet valves are controlled by solenoids in dependence upon the engine position. However, the valves have to be strong enough to withstand the considerable pressures generated in the engine cylinders. This militates against their use as fast opening and closing valves.

U.S. Pat. No. 5,113,826 shows an internal combustion engine with a solenoid operated valve upstream of a conventional inlet valve, in this case as a throttle by-pass to control engine idling. The upstream valve closes at bottom dead centre.

Pumping loss in an Otto-cycle internal combustion engine provided with a throttle is well known and has long been considered inevitable. It is caused by the loss of energy in drawing air through a restricted orifice, the throttle, in order to achieve a reduction of the mixture density required to reduce power output in the engine.

Whilst such pumping loss is avoided in a diesel engine, which has no inlet throttle and operates under extreme lean-burning conditions at low load, or in any other engine having direct fuel injection into each combustion chamber, it has hitherto been unavoidable in current throttled Otto-cycle engines.

Methods previously proposed for reducing pumping loss in Otto-cycle engines include:
  minimising idling speed;
  using a smaller capacity engine and using a higher engine speed or supercharger to recover the lost power;
  varying the timing of the inlet and exhaust valves;
  lean-burn in which the engine is designed to operate with excess inlet air, that is to say, less throttling for any given power reduction;
  exhaust gas recirculation which is similar to lean-burn; and
  cylinder deactivation in which, entire cylinders are unused at a low load, allowing the remaining cylinders to operate at a higher load. The deactivated cylinders are operated with a full air charge (similar to diesel engines) but without fuel.

The above methods for reducing pumping losses all have disadvantages. For cylinder deactivation, complex valve gears are required. Minimising the idling speed can only be performed when the engine is idling. By using lean-burn, the emissions become more difficult to control.

The present invention seeks to obviate pumping loss in a better way.

Accordingly, the present invention is directed to an Otto-cycle internal combustion engine having the construction set out in the opening paragraph of the present specification, the engine further comprising a control valve arranged upstream of the said valve of the said at least one inlet and being operable to change between a condition in which it opens the suction passage and a condition in which it closes the suction passage, an engine operating position sensor arranged to provide signals indicative of the operating position of the engine, an engine power control, and a variable intermediate position control signal generator, which generates control signals at times respectively between the beginning and the end of each of a succession of inlet valve opening periods of the engine cycle and which is connected to receive signals from the engine operating position sensor and the engine power control and to send the control signals to the control valve, whereby the operation of the control valve can be synchronised with the engine cycle operation in such a manner that in between an opening of the inlet valve and the immediately following closure thereof there is a period in which the suction passage is open and a period in which it is closed, the period for which it is open being in dependence upon the engine power control output.

Such an induction system may be applied to a target engine of conventional design with stoichiometric operation, but may also be applicable to other engine types and combustion regimes.

Preferably, the control valve comprises a shut-off valve, to enable the flow of fluid material to the said at least one inlet to be substantially shut off.

Advantageously, the shut-off valve is operated electromagnetically. Electromagnetic operation enables a speedy response valve operation.

In a preferred construction, the shut-off valve is formed with an annular flow path which extends radially relative to its axis for fluid to flow through it, and in that it has a movable shut-off member in the form of a ring which shuts off the annular flow path. An annular flow path offers low resistance to airflow by providing an adequate cross-sectional area, whilst facilitating shut-off with a relatively small movement of the shut-off member. Furthermore, the annular flow path can be so constructed that the flow of air initially accelerates and is then maintained at an approximately constant speed during the radial to axial transition when passing from the shut-off valve to the inlet.

It is advantageous if the ring is provided with an electrically conductive filament and the valve is provided with a magnetic field generator which generates a radial magnetic field relative to the axis of the valve to cause axial movement of the ring.

Preferably, the annular flow path extends radially inwardly relative to the axis of the valve, in the intended downstream direction.

Favourably, the ring is held in a support body of the valve, and a flexible annular seal is attached to and extends between the ring and the body to form a seal therebetween. The flexible annular seal allows for movement of the ring relative to the body without failing.

Alternatively, the ring is held in a support body of the valve, and a sealing ring is held by the body or the moveable ring to slide against the other of those parts to form a seal therebetween.

In a preferred construction, the engine is provided with an air filter upstream of the shut-off valve. Such an air filter reduces the risk of abrasive particles damaging the engine and the valve.

The engine may further comprise a carburettor provided upstream of the shut-off valve. The carburettor provides a fuel-air mixture upstream of the valve, allowing the mixture, or charge, to be prevented from entering the combustion chamber by activation of the shut-off valve.

In a favoured construction, the engine further comprises a fuel injector arranged to inject fuel into air or other gaseous material flowing towards the inlet. The fuel injector injects atomised fuel into the air or other gaseous material to create an aerosol, allowing combustion to occur more readily.

Preferably, the fuel injector is provided on the shut-off valve. This allows for the spray pattern of fuel to be directed into the flow path of the air or other gaseous material.

Advantageously, the engine has a plurality of combustion chambers provided with respective shut-off valves. A plurality of combustion chambers provides a more even application of power for the engine.

In a preferred construction, the shut-off valves are connected to a common control unit.

In an advantageous construction, the control unit is programmed in such a way as to enable one or more combustion chambers to be deactivated. This allows the engine to become more fuel-efficient.

According to a favoured construction, the actual combustion chamber or combustion chambers deactivated is changes from one engine cycle to the next. Such deactivation reduces cooling of a combustion chamber that may otherwise result from prolonged deactivation. More significantly, it enables a smoother delivery of power.

Preferably, the or each combustion chamber is provided by the cylinder of a piston and cylinder arrangement. Such an arrangement provides a relatively simple construction enabling compression and expansion of the combustion chamber.

Advantageously, the or each piston and cylinder arrangement is coupled to a crankshaft. The crankshaft facilitates conversion of linear movement of the piston into rotational movement.

It is preferable for a vehicle that the power control comprises an accelerator pedal. An accelerator pedal allows for 'hands-free' operation of the power control.

According to a second aspect of the present invention, there is provided a shut-off valve comprising an annular flow path which extends radially relative to its axis for fluid to flow through it, and a movable shut-off member in the form of a ring which shuts off the annular flow path.

Preferably, the ring is moved electromagnetically.

The valve may be retrofitted to existing engines. Such retrofitting provides a cost effective method for improving the efficiency of the engines.

Preferably, the ring is provided with an electrically conductive filament and the valve is provided with a magnetic field generator which generates a radial magnetic field relative to the axis of the valve to cause axial movement of the ring.

According to an advantageous construction, the annular flow path extends radially inwardly relative to the axis of the valve, in the intended downstream direction.

In an advantageous arrangement, the ring is held in a support body of the valve, and a flexible annular seal is attached to and extends between the ring and the body to form a seal therebetween.

Alternatively, the ring is held in a support body of the valve, and a sealing ring is held by the body or the moveable ring to slide against the other of those parts to form a seal therebetween.

The invention further comprises a method of operating an Otto cycle internal combustion engine having at least one combustion chamber provided with at least one inlet and at least one outlet with respective valves at the said at least one inlet and at the said at least one outlet, comprising enabling gaseous material to flow into and out of the chamber, and shutting off the flow of fluid to the inlet at a time while the said at least one inlet valve remains open in synchronization with the operation of the engine cycle and in dependence upon the condition of a power control of the engine.

Such a method may be effected by using an Otto cycle internal combustion engine as set out in one or more of the foregoing paragraphs.

According to a further aspect of the present invention, there is provided an Otto-cycle internal combustion engine provided with a multiplicity of combustion chambers, each with at least one inlet and at least one outlet to enable fluid material to flow into and out of the combustion chamber, and control means connected to selectively deactivate one or more of the chambers, characterised in that the actual chambers which are deactivated are changed from one engine cycle to the next to reduce the extent to which deactivated chambers are cooled.

An example of an Otto-cycle internal combustion engine embodying the present invention will now be described with reference to the accompanying drawings in which:

FIG. 2b is a perspective sectional view of the shut-off valve of FIG. 2a;

FIG. 2e is a cross-sectional view of a shut-off member of the shut-off valve of FIG. 2a;

Figure 1:
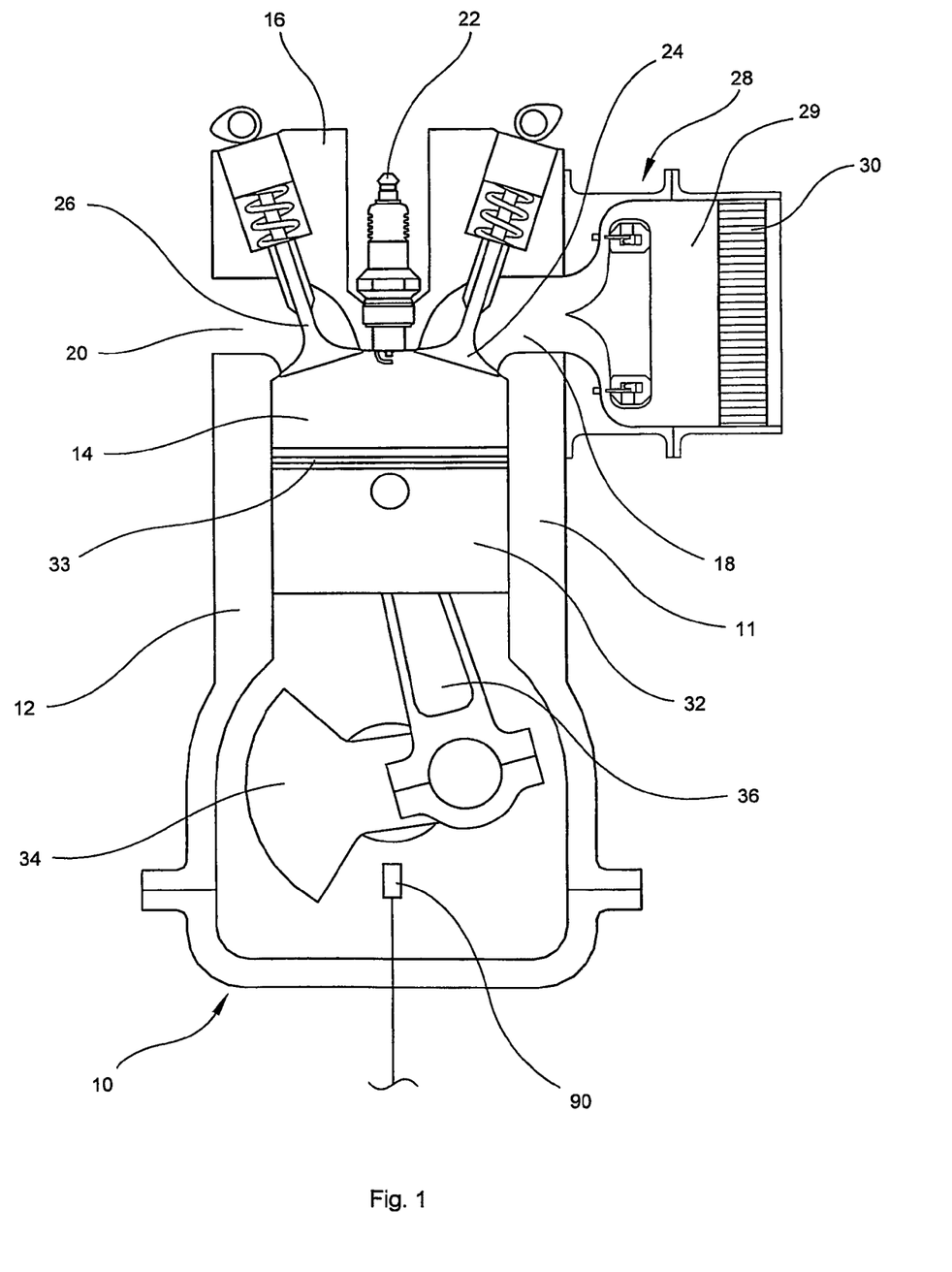
FIG. 1 is a cross-sectional view of an Otto-cycle internal combustion engine embodying the present invention.

An Otto-cycle internal combustion engine 10 shown in FIG. 1 and FIGS. 2a to 2e comprises an engine block 11 through which are machined a multiplicity of cylinders, one of which is shown in FIG. 1 as cylinder 12 of a piston and cylinder arrangement. The inner cavity of the cylinder 12 constitutes a combustion chamber 14. At the upper end of the cylinder 12 a cylinder head 16 is mounted through which pass an inlet 18 and an outlet 20 to enable gaseous material to flow into and out of the combustion chamber 14. A spark plug is also attached to the cylinder head 16 with the sparking end protruding through the bottom surface of cylinder head 16 into the combustion chamber 14. An inlet valve 24 passes through the cylinder head 16 and, when in a closed position, shuts off the inlet 18, preventing flow of gaseous material from the combustion chamber 14 through the inlet 18. Similarly an outlet valve 26 passes through the cylinder head 16 shutting off the outlet 20 when in a closed position, preventing the flow of gaseous material from the combustion chamber through the outlet 20.

A control or shut-off valve unit 28 is arranged upstream of the inlet 18 on the outside of cylinder 12, to enable the flow of gaseous material to the inlet 18 via a suction passage 29, through which passes all the gaseous or aerosol material which passes to the inlet 18, to be controlled or shut off. Thus the shut-off valve unit 28 is operable to change between a condition in which it opens the suction passage 29 to a condition in which it closes the suction passage 29. An air filter 30 is provided upstream of the shut-off valve unit 28 for filtering incoming air. A fuel injector 31 is arranged in the shut-off valve unit 28 to inject fuel into the gaseous material flowing from the valve unit 28 towards the inlet 18.

A piston 32 is positioned for reciprocal movement within the cylinder 12, piston rings 33 being provided to create a seal between the piston 32 and the internal walls of the cylinder 12. The piston is coupled to a crankshaft 34 via a connecting rod 36. As the piston 32 reciprocates within the cylinder 12, the volume of combustion chamber 14 alternately expands and contracts.

Figure 2A:
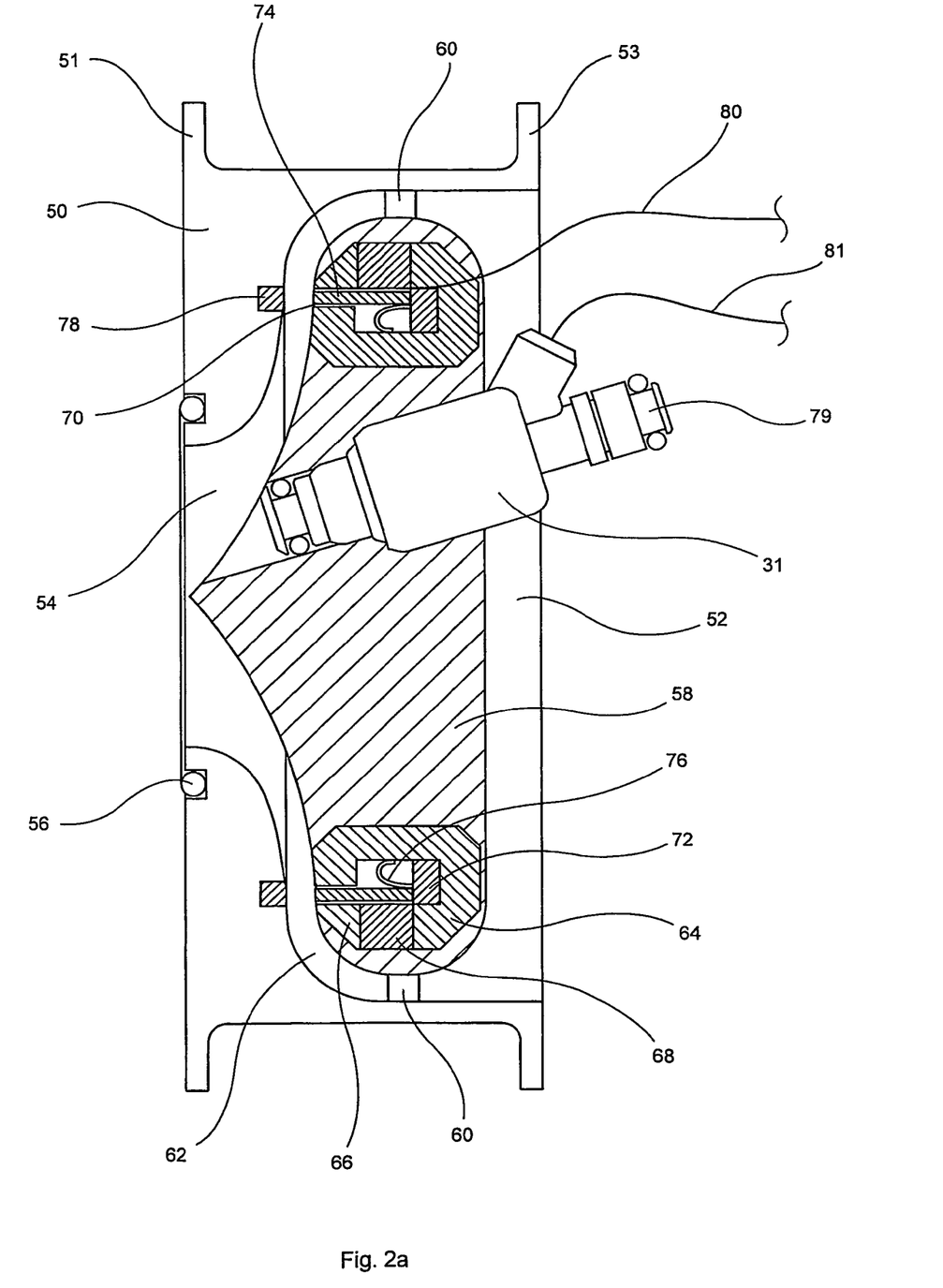
FIG. 2a is an enlarged cross-sectional view of the shut-off valve of FIG. 1.
Figure 2B:
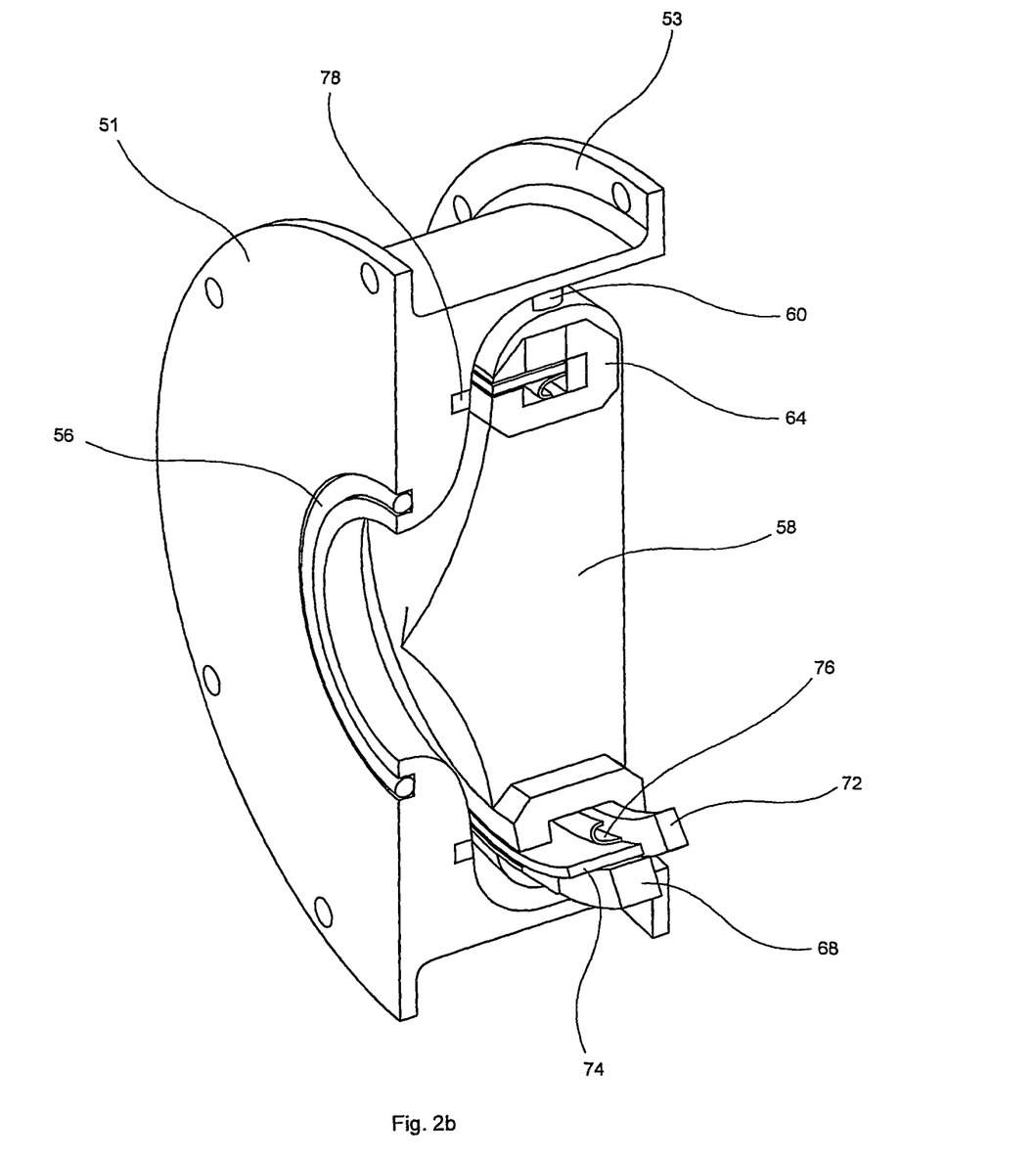
Figure 2C:
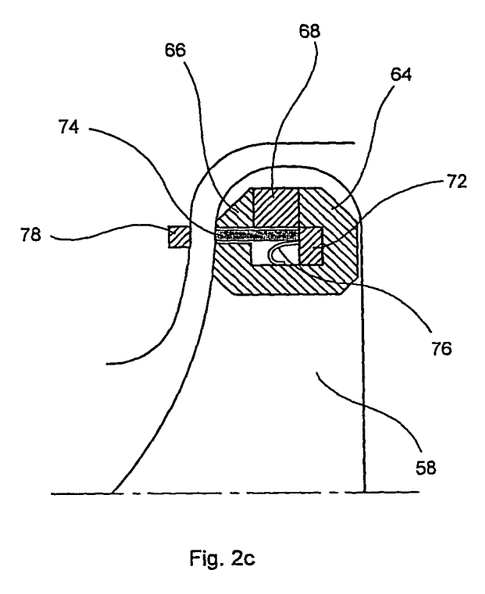
FIG. 2c is a radial section of the shut-off valve of FIG. 2a in an open position.
Figure 2D:
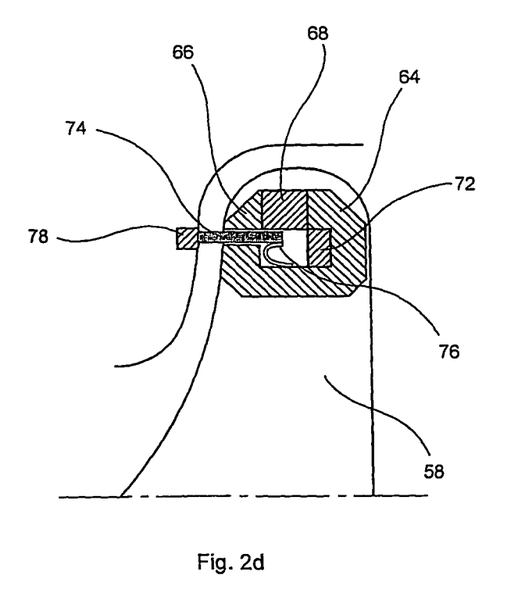
FIG. 2d is a radial section of the shut-off valve of FIG. 2a in a closed position.

The shut-off valve unit 28 comprises a main housing body 50, having a connecting flange 51 for connection of the valve unit 28 to the cylinder head 16 and the engine block 11 at one end and a connection flange 53 for connecting the valve unit 28 to the air filter 30 at the other end. The main body has a relatively large diameter inlet opening 52 at the air filter connection end narrowing to a smaller diameter outlet opening 54 at the opposite, cylinder connecting end, the outlet opening 54 having a cross-sectional diameter equal to that of the combustion chamber inlet 18. A resilient flexible ring seal 56 is provided around the outlet opening 54 to ensure an impermeable seal when the shut-off valve unit is connected to the outside of the cylinder head 16 and the engine block 11, with the outlet opening 54 in registration with the combustion chamber inlet 18 to allow gaseous material to flow from the shut-off valve unit 28 into the combustion chamber 14 with little or no turbulence.

An annular and impermeable, inner rigid member 58 is rigidly attached within and to the main housing body 50 by vanes 60. The external surfaces of the inner rigid member 58 are shaped generally to follow the contours of the inner surface of the main housing body 50. The inner rigid member 58 is positioned to form an annular flow path 62 around it, between itself and internal surfaces of the housing body 50. The annular flow path 62 extends radially inwardly in a downstream direction relative to its axis for gaseous material to flow through it.

The inlet opening 52, the outlet opening 54 and the annular flow path 62 constitute the suction passage 29.

Within the inner rigid member 58 are a pair of rigid annular ferromagnetic pole pieces 64 and 66. These annular ferromagnetic pieces 64 and 66 are rigidly attached to opposite pole faces of an annular permanent rare earth magnet 68. These combined magnet components 64, 66 and 68 in radial section appear to have a shape generally resembling the letter "G" or the mirror image of the letter "G", with outer surfaces of the pole pieces 64 and 66 and of the magnet 68 corresponding to the top of the letter "G" and being flush with the one another. The outer surfaces of the pole pieces 64 and 66, which are directed towards the inlet 18, are flush with the adjacent surfaces of the inner rigid member 58. A thin annular gap 70 is provided between the pole pieces 64 and 66 and extends between the interior of the "G" and the annular flow path 62. An intense radial magnetic field is thereby created in the gap 70. The magnet 68 is polarised in the direction of the central axis of the inner rigid member 58.

A buffer 72, made from an elastomer such as polyurethane, is located within the "G" interior opposite the narrow gap 70.

An annular movable shut-off member or ring 74, in the form of an impermeable short cylinder of ceramic, is positioned within the gap 70 between the pole pieces 64 and 66, and extends into the interior of the "G". It is fixed at the end nearest the buffer 72 to one end of a rolling elastomer seal 76. The other end of rolling elastomer seal 76 is fixed to an interior surface of the pole piece 64 at a position mid-way between buffer 72 and the gap 70. The rolling elastomer seal 76 is designed to withstand 1 bar pressure difference and a force acting upon the ring by the magnets when the shut-off valve unit 28 is activated to effect opening is sufficient to overcome 1 bar pressure difference when the valve is opened under certain conditions.

Figure 2E:
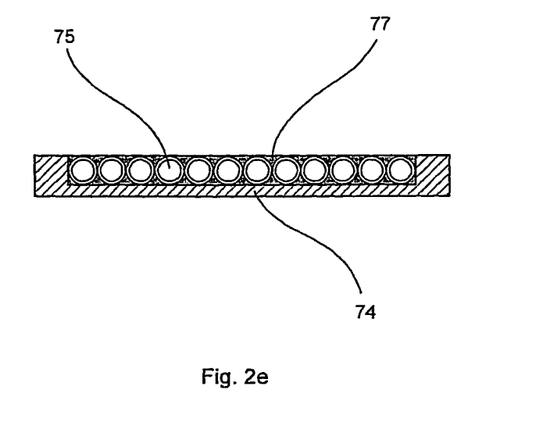

Within the shut-off member 74 are fifteen turns of a conductor 75 such as enamelled copper wire wound as a helix which extends across its width, as shown in FIG. 4e. A ceramic former 77 is used to provide a high-durability face to the shut-off member 74. A seal 78 is set into the main housing body 50 opposite the gap 70 between the pole pieces 64 and 66. A power supply cable 80 extends through the main housing body 50, one of the vanes 60, and the annular ferromagnetic pole piece 64, to the shut off member 74, to provide a source of electricity thereto. The shut-off member 74 is free to slide in the gap 70 to extend across the annular flow path 62 and retract back into the interior of the magnet arrangement 64, 66 and 68.

The radius of the annular gap 70 and the shut-off member 74 is approximately twice that of the outlet opening 54. At this point, the spacing between the surfaces which define the flow path is one eighth of the diameter of the outlet opening 54, whilst providing the same cross-sectional flow path area as the outlet opening 54. For example, in a shut-off valve with a five-millimetre spacing or gap 70, its outlet diameter 54 would be forty millimetres.

A fuel injector 31 is positioned within the inner rigid member 58 to introduce gaseous or aerosol fuel in to the annular flow path 62. Alternatively, there may be a pre-existing location for a fuel injector in the cylinder head 16. It is generally considered desirable for the spray pattern of a fuel injector to be directed toward the inlet 18. Consequently, a fuel injector arrangement located with the rigid inner member 58 may be offset from the central axis of the shut-off valve unit 28.

An engine operating position sensor 90 is arranged to provide signals indicative of the operating position of the engine. An engine power control foot pedal 92 is also provided. A control unit 94 is connected to receive signals from the engine operating position sensor 90 and the engine power control 92 and to send control signals to the shut-off valve unit 28, whereby the operation of the shut-off valve unit 28 can be synchronised with the engine cycle operation and dependent upon the output from the power control 92. The control unit 94 determines the position of the shut-off member 74 in dependence upon engine position and conditions, the position of the foot pedal 92, and in accordance with pre-recorded data that gives the optimum opening and closing times, relative to engine position, for given engine conditions and pedal position. Thus the control unit 94 includes a variable intermediate position control signal generator 95 which generates control signals at times respectively between the beginning and the end of each of a succession of inlet valve opening periods of the engine cycle.

Figure 1A:
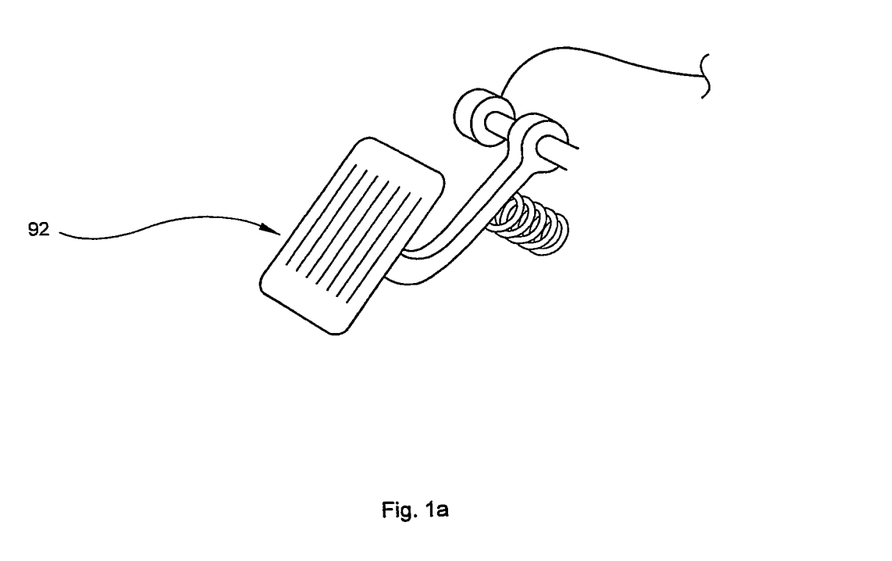
FIG. 1a is a diagram of a control pedal for the engine shown in FIG. 1.
Figure 3A:
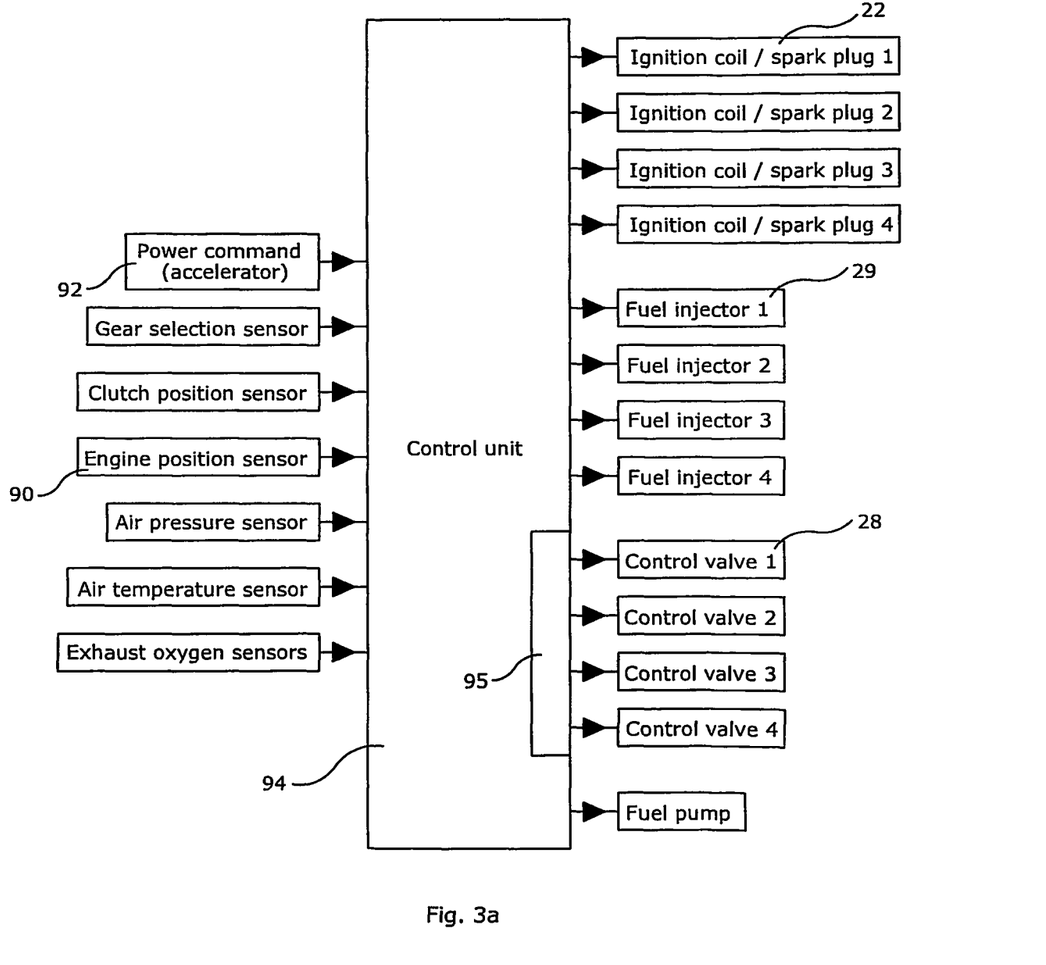
FIG. 3a is a schematic diagram of a control unit for an engine having the features illustrated in FIGS. 1 to 2f.

The inputs and outputs of the control unit 94 for the multi-cylinder engine are shown in FIG. 3a. Thus, the following devices are connected to inputs of the control unit 94:
   an engine power control foot pedal, labelled 92 in FIG. 1a;
   a gear selection sensor;
   a clutch position sensor;
   an engine position sensor, labelled 90 in FIG. 1;
   an air pressure sensor;
   an air temperature sensor; and
   exhaust oxygen sensors.

The following devices are connected to the outputs of the control unit 94:
   four spark plugs, one of which is labelled 22 in FIG. 1;

four fuel injectors, one of which is labelled 29 in FIG. 2*a*;
via the control signal generator 95 of the control unit 94, four shut-off valves, one of which is labelled 28 in FIG. 1; and
a fuel pump.

Figure 3B:
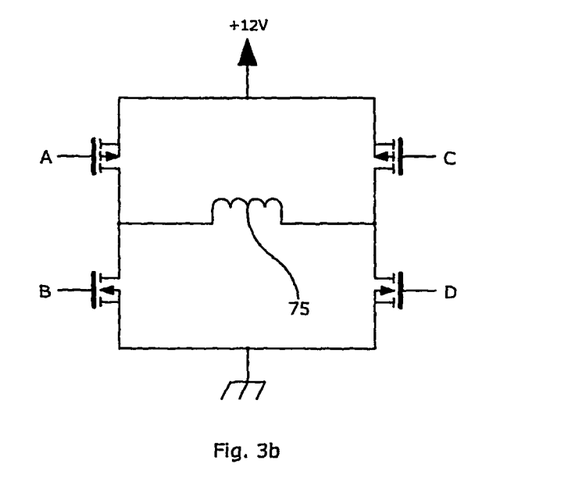
FIG. 3b is a circuit diagram of a circuit used to control the shut-off valve shown in FIGS. 2 to 2e or in FIG. 2f.
Figure 3C:
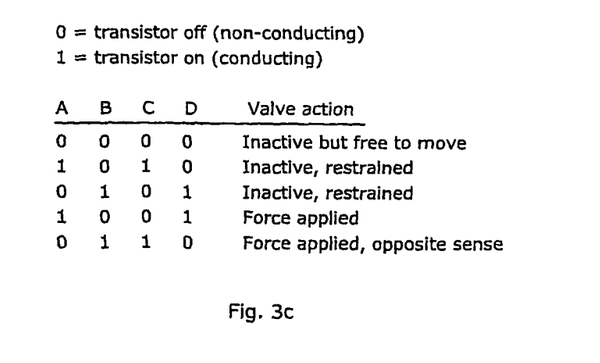
FIG. 3c is a truth table for the control circuit of FIG. 3b.

FIG. 3*b* shows a bridge arrangement of four transistors, A to D, for controlling the shut-off valve unit 28. Transistors A and B are connected in series with one another as are transistors C and D. The pair A and B are connected in parallel with the pair C and D, between earth and a 12V line. The shut-off valve member conductor 75 is connected across a first point in a conductor connecting transistors A and B, and a second point in a conductor connecting transistors C and D. As can been seen from the truth table in FIG. 3*c*, when all of the transistors are switched off, the shut-off member 74 is inactive but free to move. When transistors A and C are turned on with B and D turned off, or B and D are turned on with A and C turned off, the shut-off member is inactive but restrained against movement, whether in the open or closed position or for that matter in an intermediate position, owing to induced eddy currents. When transistors A and D are both switched on with B and C off, the shut-off member is moved into the annular flow path 62 if not already there and is urged against seal 78. When transistors B and C are both switched on with A and D off, the shut-off valve member 74 is moved towards the buffer 72 if such movement is available and is urged against the buffer 72.

When in operation, air enters the shut-off valve unit 28 from the air filter 30 through the inlet opening 52, past vanes 60, and flows radially inwardly through annular flow path 62 and exits the shut-off valve unit 28 axially through the outlet opening 54 into the combustion chamber inlet 18. The vanes 60 are streamlined to offer reduced resistance to the flow of air. The annular flow path 62 is the only intended means by which air can enter the combustion chamber inlet 18. Furthermore, the annular flow path 62 offers low resistance to airflow by having an appropriate unchanging cross-sectional area throughout, although this area is much smaller that that of the flow-path between the filter 30 and the valve unit 28. In this respect, the flow of air initially accelerates and is then maintained at an approximately constant speed during the radial to axial transition at the outlet opening 54.

For a power control foot pedal 92 setting intermediate between idling and full power, the annular flow path 62 remains open for a proportion of the induction stroke, the higher the power required the greater is this proportion. During the time period the valve is fully open, air and fuel (from the injector 31) are fed into the chamber 14 from the inlet 18, and there is little or no loss of energy by any gaseous material being sucked through a throttle. At the end of this proportion of the induction stroke, the flow path 62 is shut-off by the shut-off valve unit 28, such that a partial vacuum is created in combustion chamber 14 by the end of the induction stroke. During this latter part of the induction stroke, therefore, no fuel or air flows into the combustion chamber 14. Furthermore, the shutting-off causes energy to be absorbed as the partial vacuum acts on the piston 32. A substantial proportion of this energy is recovered in the succeeding compression stroke.

If full power is required with the foot pedal 92 fully depressed, the shut-off valve unit 28 remains open and does not operate at all. In this mode, the engine operates conventionally, and there is little or no energy loss caused by air flow through a throttle.

The precise timing of the closure of the shut-off valve unit 28 is determined by the variable intermediate position control signal generator 95 of the central control unit 94 in dependence upon the position of the foot pedal 92. According to how far it is depressed, the control unit 94 determines when in the induction stroke the valve unit 28 should be shut, and when the sensor 90 indicates that this engine position has been reached it immediately causes the valve unit 28 to shut. It does this by causing an electrical current to be passed through the power supply cable 80 to the shut-off member 74. The shut-off member 74 then becomes magnetic owing to the current flowing through the bonded aluminium foil. The shut-off member 74 is then moved axially by the intense magnetic field established by the magnetic arrangement 64, 66 and 68, thus effectively closing the annular flow path 62.

The shut-off member 74 has a mass of approximately 15 grams and can be fully shut (or opened) within 4 milliseconds. Accelerations of over 1000 ms$^{-2}$ are involved. The shut-off valve member 74 is therefore slowed prior to full closing (or opening) to minimise impact, noise and seal wear.

Thus, the air/fuel mixture fed to the inlet 18 from filter 30 and the fuel injector 31 via the annular flow path 62, enters the combustion chamber 14 of the Otto-cycle engine and is combusted in a conventional way in accordance with such an engine. As the compression stroke begins, the inlet valve 24 is closed. The closure of inlet valve 24 prevents any backflow from combustion chamber 14 into the inlet 18 as the piston 32 compresses the combustion chamber 14. The direction of flow of the electrical current provided by power cable 80 is reversed to open the valve unit 28 causing the shut-off member 74 to retract, opening the valve unit 28 and hence the annular flow path 62.

The shut-off valve unit 28 remains in an open position during the combustion stroke and the exhaust stroke, with the inlet valve 24 in a closed position. During the following induction stroke or inlet valve opening period, the shut-off valve unit 28 is activated and the shut-off member 74 moves axially in to the air flow path 62, closing the air flow path 62, at the appropriate time during the induction stroke, and the whole process is repeated. As a result, between an opening of the inlet valve 24 and the immediately following closure thereof, there is a period in which the suction passage 29 is open and a period in which it is closed, the period for which it is open, or the fraction of the whole period for which the inlet valve 24 is open, for which the shut-off valve or control valve unit 28 is open, being in dependence upon the output from the engine power control 92.

When the engine is operating at less than full power, the control unit 94 can be used to deactivate a particular cylinder of the engine. By deactivation it is meant that a full charge of air is allowed to enter the combustion chamber 14 without introducing any fuel to the combustion chamber 14. That is to say the valve unit 28 remains fully open but no fuel is injected into the air stream by the fuel injector 31. There is little energy loss because of the resilience of the system, so that the piston effectively bounces back for example after compression. Therefore, no power is derived from the cycle in that chamber. The control unit, in dependence upon the load on the engine will control the shut off by the control valve unit 28, and also whether fuel is injected through the injector 31, to alter the deactivation cycle.

The control unit 94, as described herein, allows an arbitrary cycle-by-cycle sequence of activation or deactivation to be determined independently for each combustion chamber 14, thus avoiding the need to designate certain combustion chambers 14 for prolonged deactivation. Such single cycle or short sequence deactivation prevents excessive temperature variation, and allows deactivation to be applied with smoother power delivery, especially by engines with a low number of combustion chambers 14.

Figure 4A:
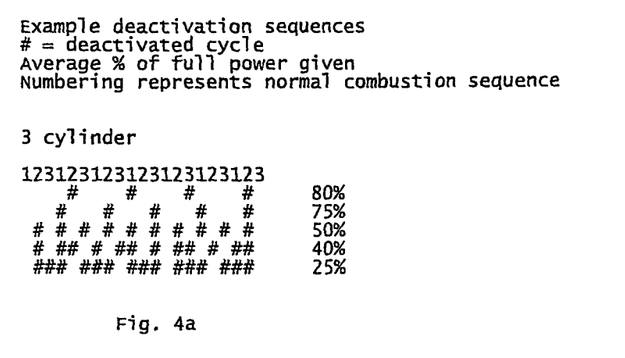
FIGS. 4a to 4c are respective explanatory tables showing operative of the different respective Otto cycle engines.
Figure 4B:
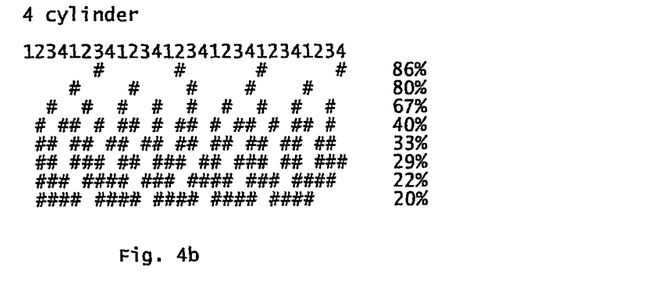
Figure 4C:
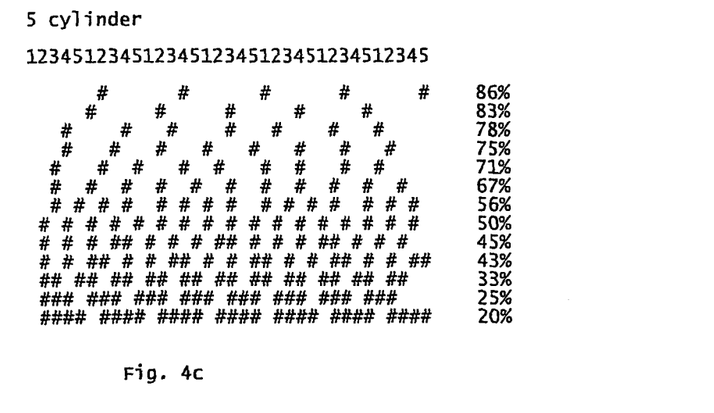

FIGS. 4a to 4c show example deactivation sequences and the percentages of the full power of the engine obtained from each sequence, for three, four and five cylinder engines respectively. Thus it will be appreciated that for example with a four-cylinder engine (see FIG. 4b) operating at 86% power, in a first cycle the third cylinder is deactivated, then in the next cycle the second cylinder is deactivated, then the first, then the fourth so that not one cylinder gets too cool. The cylinder number here is determined by the normal firing order, not the position of the chamber in the engine.

It is conceivable that cylinder deactivation is applied when the foot pedal 92 is fully depressed, in the event for example of a speed limiter being in operation.

Figure 5A:
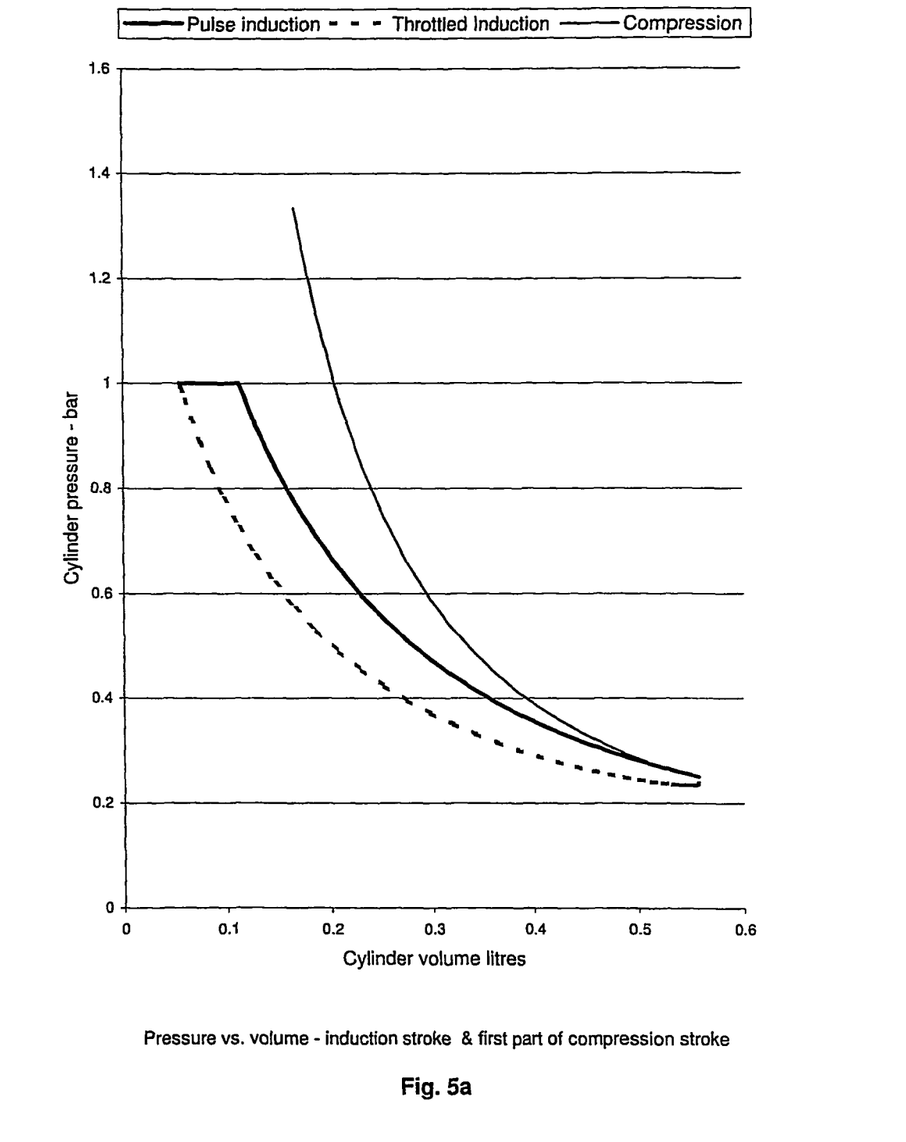
FIGS. 5a to 5d are an explanatory graphs.

For a given charge, the average partial vacuum during the induction stroke is reduced compared with that of conventional throttle means as shown in FIG. 5a. The area between the two induction curves in FIG. 5a represents the amount of energy saved by restricting the annular flow path 62 by means of a shut-off valve unit 28 in accordance with the present invention.

Figure 5B:
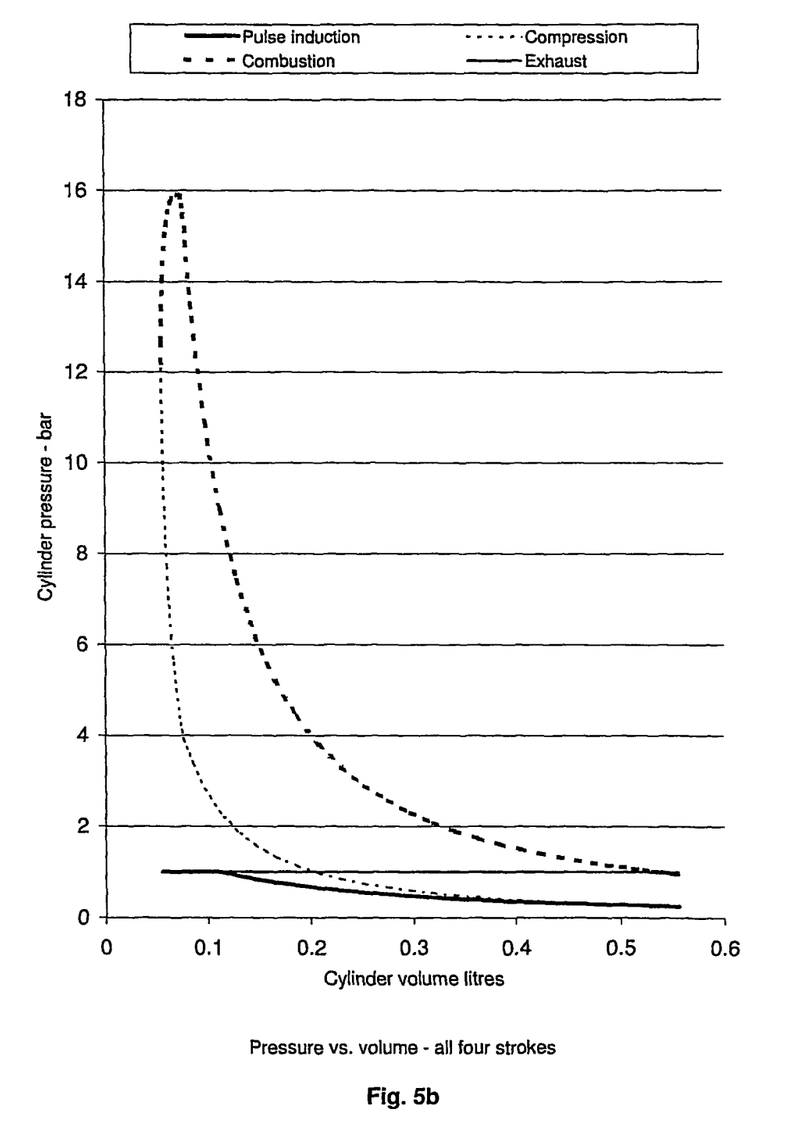

FIG. 5b shows a complete Otto-cycle for an engine in accordance with the present invention.

Figure 5C:
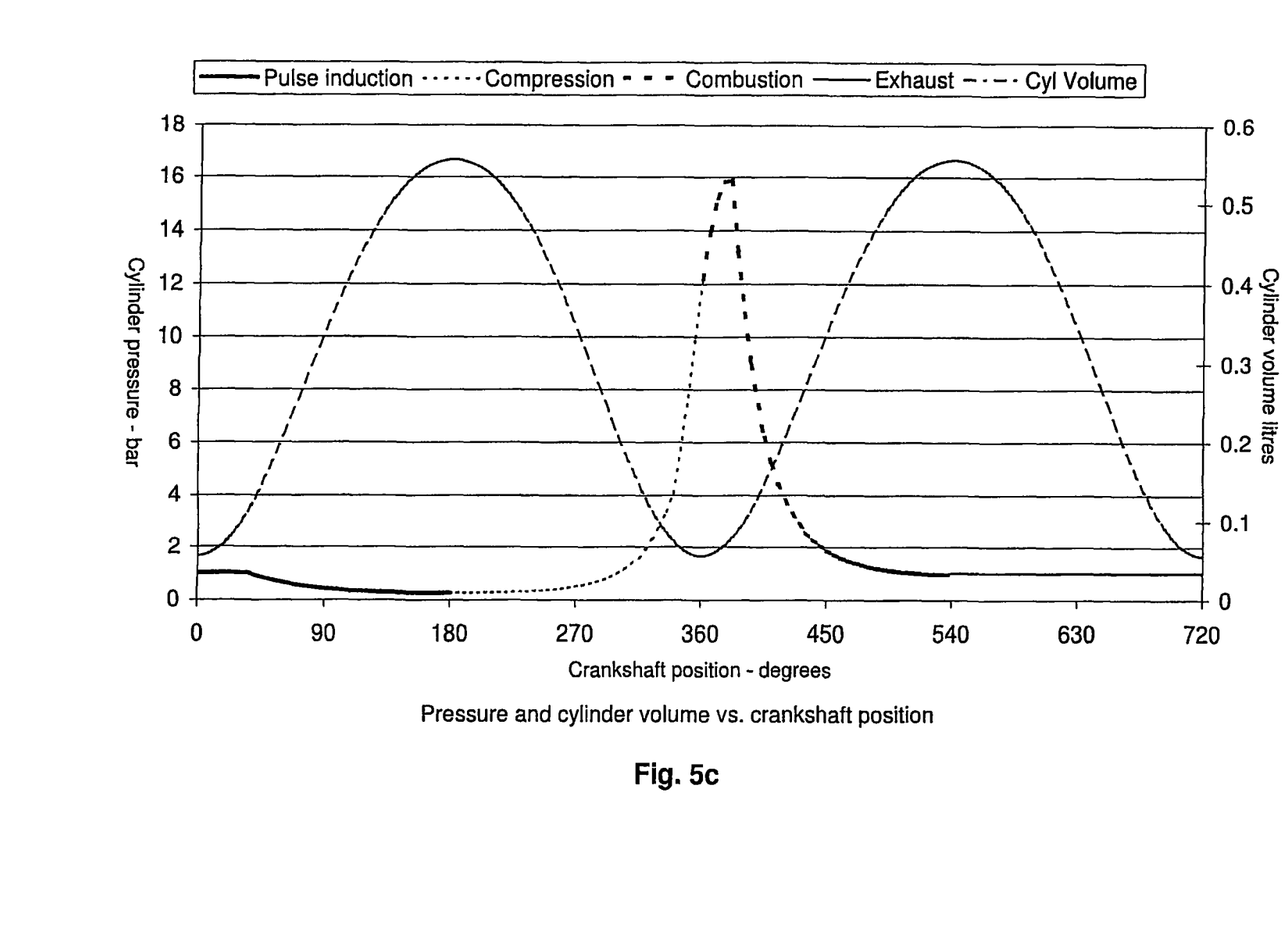
Figure 5D:
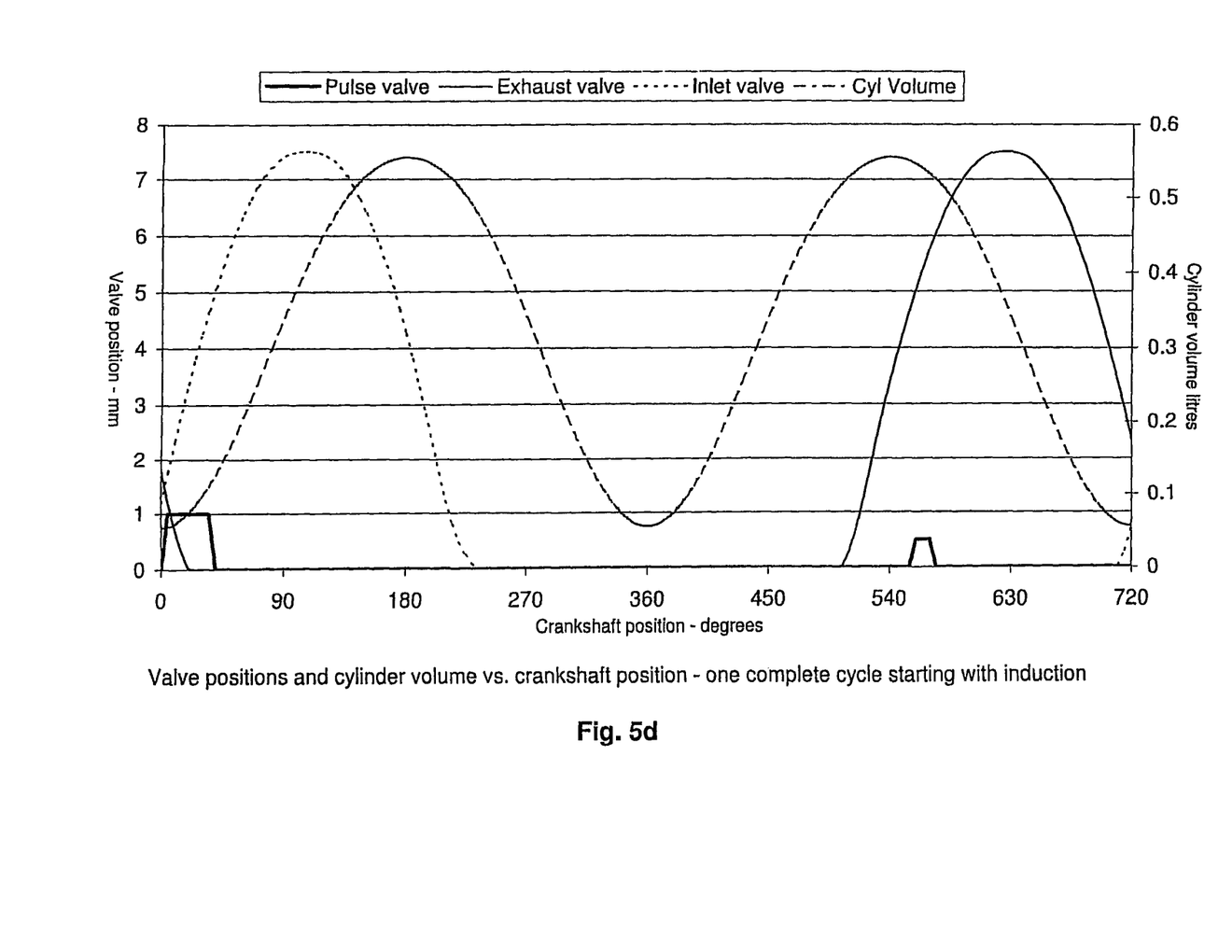

FIG. 5c depicts the pressure and volume of the combustion chamber 14 as a function of crankshaft or engine position, under conditions of low speed and low power operation. It also shows the duration of operation of the shut-off valve unit 28. FIG. 5d shows the valve positions and combustion chamber 14 volumes as a function of crankshaft or engine position. For a combustion chamber 14 with a capacity of 0.5 litres, the movement of the shut-off member 74 may be 5 millimetres. It will be noted from FIG. 5d that the shut-off valve unit 28, when open, does not need to be fully open if the engine is idling or on low power output since in such conditions a partial opening will be sufficient to allow through all the required air without undue energy loss through the valve. Such a situation is illustrated in FIG. 5d for a crankshaft position in the range from about 560 degrees to about 590 degrees. The shut-off valve unit 28 may be operated while the inlet valve 24 is closed in order to relieve a partial vacuum formed in the inlet 18 as shown in FIG. 5d. If the partial vacuum is not relieved in this way, exhaust gas may relieve the partial vacuum, resulting in a form of exhaust gas recirculation.

It will also be seen from FIG. 5d that most of the time the shut-off valve unit 28 is shut. However, provided it is shut for the appropriate part of the intake stroke, it does not matter so much whether, whilst the inlet valve 24 is shut, the control valve unit 28 is open, shut or in an intermediate position between open and shut. The actual choice here may depend on secondary effects which may vary from engine to engine.

Figure 2F:
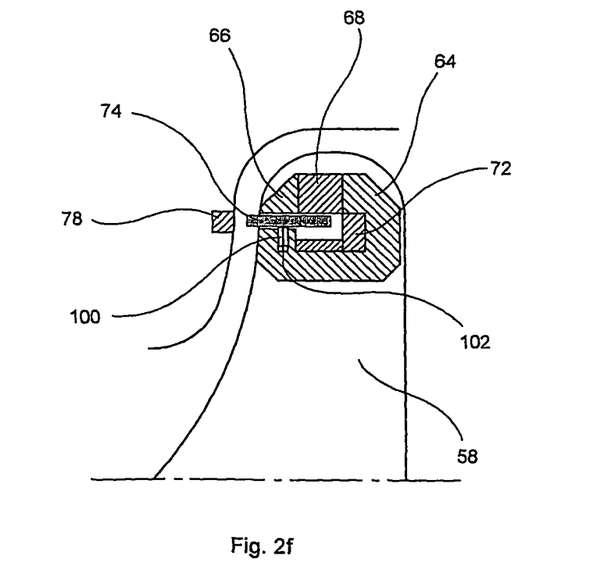
FIG. 2f is a radial section of a modified shut-off valve of FIG. 2a in an intermediate position.

In a second embodiment, as shown in FIG. 2f, the rolling elastomer seal 76 is omitted and a piston ring 100 is inserted into an annular slot 102 in the ferromagnetic pole piece 64 to expand against the shut-off member 74 and form a sliding seal.

Numerous variations and modifications to the illustrated construction may occur to the reader familiar with the art without taking the device and method described herein outside the scope of the present invention. For example, the shut-off valve flow path may be elongate transversely of its central axis instead of annular.

The number of turns of conductor 75 in the control member 74 does not have to be fifteen, and may be anything from one to one hundred or more. If this member is itself electrically conductive, except only for a small radial insulting strip to prevent a short circuit, the member 74 itself may constitute the conductor here.

Instead of an injector 31, fuel may be introduced by carburettor means placed upstream of the shut-off valve but downstream of the air filter. In such a system, it is desirable for the carburettor means to be provided with means for enabling or disabling fuel flow in response to a signal from the engine control unit.

There may be a trade off between loss of energy and wear and tear on the control valve if the latter is not ever fully closed, but at times when it has been described as being closed it is instead very nearly closed.

Whilst the shut-off valve unit 28 completely shuts off supply of air to the inlet 18 when it is closed, it would work, albeit slightly less well, if a very small gap is left between the seal 78 and the shut-off member 74, as long as the suction passage 29 is substantially closed. The benefit from this is less wear on the seal 78 and the shut-off member 74.

The invention claimed is:

1. An Otto cycle internal combustion engine provided with at least one combustion chamber and at least one inlet and at least one outlet with respective valves at the said at least one inlet and at the said at least one outlet respectively to enable fluid material to flow into and out of the said at least one combustion chamber in accordance with the engine cycle operation, and a suction passage leading to the said at least one inlet to conduct the flow of fluid material thereto, the engine further comprising a control valve arranged upstream of the said valve of the said at least one inlet, and being operable to change between a condition in which it opens the suction passage and a condition in which it closes the suction passage, an engine operating position sensor arranged to provide signals indicative of the operating position of the engine, an engine power control, and a variable intermediate position control signal generator, which generates control signals at times respectively between the beginning and the end of each of a succession of inlet valve opening periods of the engine cycle and which is connected to receive signals from the engine operating position sensor and the engine power control and to send the control signals to the control valve, whereby the operation of the control valve can be synchronised with the engine cycle operation in such a manner that in between an opening of the inlet valve and the immediately following closure thereof there is a period in which the suction passage is open and a period in which it is closed, the period for which it is open being in dependence upon the engine power control output.

2. An Otto cycle internal combustion engine according to claim 1, in which the control valve comprises a shut-off valve, to enable the flow of fluid material to the said at least one inlet to be substantially shut-off.

3. An Otto cycle internal combustion engine according to claim 2, in which the shut-off valve is operated electromagnetically.

4. An Otto cycle internal combustion engine according to claim 2, in which the shut-off valve is formed with an annular flow path which extends radially relative to its axis for gaseous material to flow through it, and in that it has a movable shut-off member in the form of a co-axial ring which shuts off the annular flow path.

5. An Otto cycle internal combustion engine according to claim 4, in which the ring is provided with an electrically conductive filament and the valve is provided with a magnetic field generator which generates a radial magnetic field relative to the axis of the valve to cause axial movement of the ring.

6. An Otto cycle internal combustion engine according to claim 4, in which the annular flow path extends radially inwardly relative to the axis of the valve, in the intended downstream direction.

7. An Otto cycle internal combustion engine according to claim 4, in which the ring is held in a support body of the valve, and a flexible annular seal is attached to and extends between the ring and the body to form a seal therebetween.

8. An Otto cycle internal combustion engine according to claim 4, in which the ring is held in a support body of the valve, and a sealing ring is held by the body or the moveable ring to slide against the other of those parts to form a seal therebetween.

9. An Otto cycle internal combustion engine according to claim 2, provided with an air filter upstream of the shut-off valve.

10. An Otto cycle internal combustion engine according to claim 2, further comprising a carburettor provided upstream of the shut-off valve.

11. An Otto cycle internal combustion engine according to claim 2, further comprising a fuel injector arranged to inject fuel into air or other gaseous material flowing towards the inlet.

12. An Otto cycle internal combustion engine according to claim 11, in which the fuel injector is provided on the shut-off valve.

13. An Otto cycle internal combustion engine according to claim 2, in which there are a plurality of combustion chambers provided with respective shut-off valves.

14. An Otto cycle internal combustion engine according to claim 13, in which the shut-off valves are connected to a common control unit.

15. An Otto cycle internal combustion engine according to claim 14, in which the control unit is programmed in such a way as to enable one or more combustion chambers to be deactivated.

16. An Otto cycle internal combustion engine according to claim 11, in which the actual combustion chamber or combustion chambers to be deactivated is changeable from one engine cycle to the next.

17. An Otto cycle internal combustion engine according to claim 1, in which the or each combustion chamber is provided by the cylinder of a piston and cylinder arrangement.

18. An Otto cycle internal combustion engine according to claim 17, in which the or each piston and cylinder arrangement is coupled to a crankshaft.

19. An Otto cycle internal combustion engine according to claim 18, in which the power control comprises an accelerator pedal.

20. A control valve comprising an annular flow path which extends radially relative to its axis for fluid to flow through it, and a movable member in the form of a co-axial ring which adjusts the effective flow cross-section of the flow path.

21. A control valve according to claim 20, in which the ring is moved electromagnetically.

22. A control valve according to claim 20, in which the valve is a shut-off valve.

23. A control valve according to claim 20, in which the ring is provided with an electrically conductive filament and the valve is provided with a magnetic field generator which generates a radial magnetic field relative to the axis of the valve to cause axial movement of the ring.

24. A control valve according to claim 20, in which the annular flow path extends radially inwardly relative to the axis of the valve, in the intended downstream direction.

25. A control valve according to claim 20, in which the ring is held in a support body of the valve, and a flexible annular seal is attached to and extends between the ring and the body to form a seal therebetween.

26. A control valve according to claim 20, in which the ring is held in a support body of the valve, and a sealing ring is held by the body or the moveable ring to slide against the other of those parts to form a seal therebetween.

27. A method of operating an Otto cycle internal combustion engine having at least one combustion chamber provided with at least one inlet and at least one outlet with respective valves at the said at least one inlet and at the said at least one outlet, comprising enabling fluid to flow into and out of the chamber, and shutting off the flow of fluid to the inlet at a time while the said at least one inlet valve remains open in synchronization with the operation of the engine cycle and in dependence upon the condition of a power control of the engine.

28. A method of operating an Otto cycle internal combustion engine, having at least one combustion chamber provided with at least one inlet and at least one outlet with respective valves at the said at least one inlet and at the said at least one outlet, comprising enabling fluid to flow into and out of the chamber, and shutting off the flow of fluid to the inlet at a time while the said at least one inlet valve remains open in synchronization with the operation of the engine cycle and in dependence upon the condition of a power control of the engine in which the engine is as claimed in claim 1.

29. An Otto cycle internal combustion engine provided with a multiplicity of combustion chambers, each with at least one inlet and at least one outlet to enable fluid material to flow into and out of the combustion chamber, and control means connected to selectively deactivate one or more of the chambers, characterised in that the actual chambers which are deactivated are changed from one engine cycle to the next to reduce the extent to which deactivated chambers are cooled.

* * * * *